Patented Aug. 31, 1954

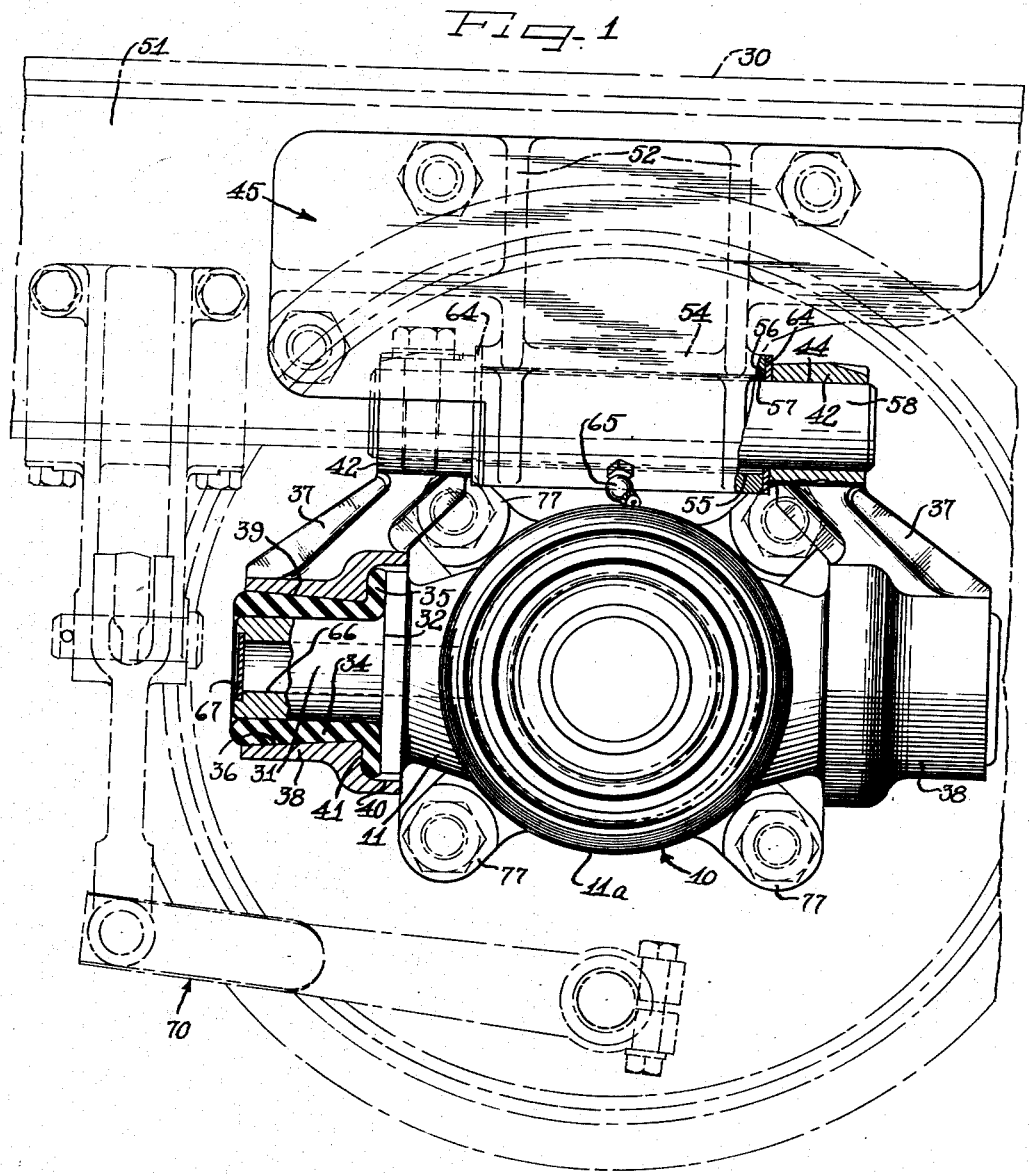

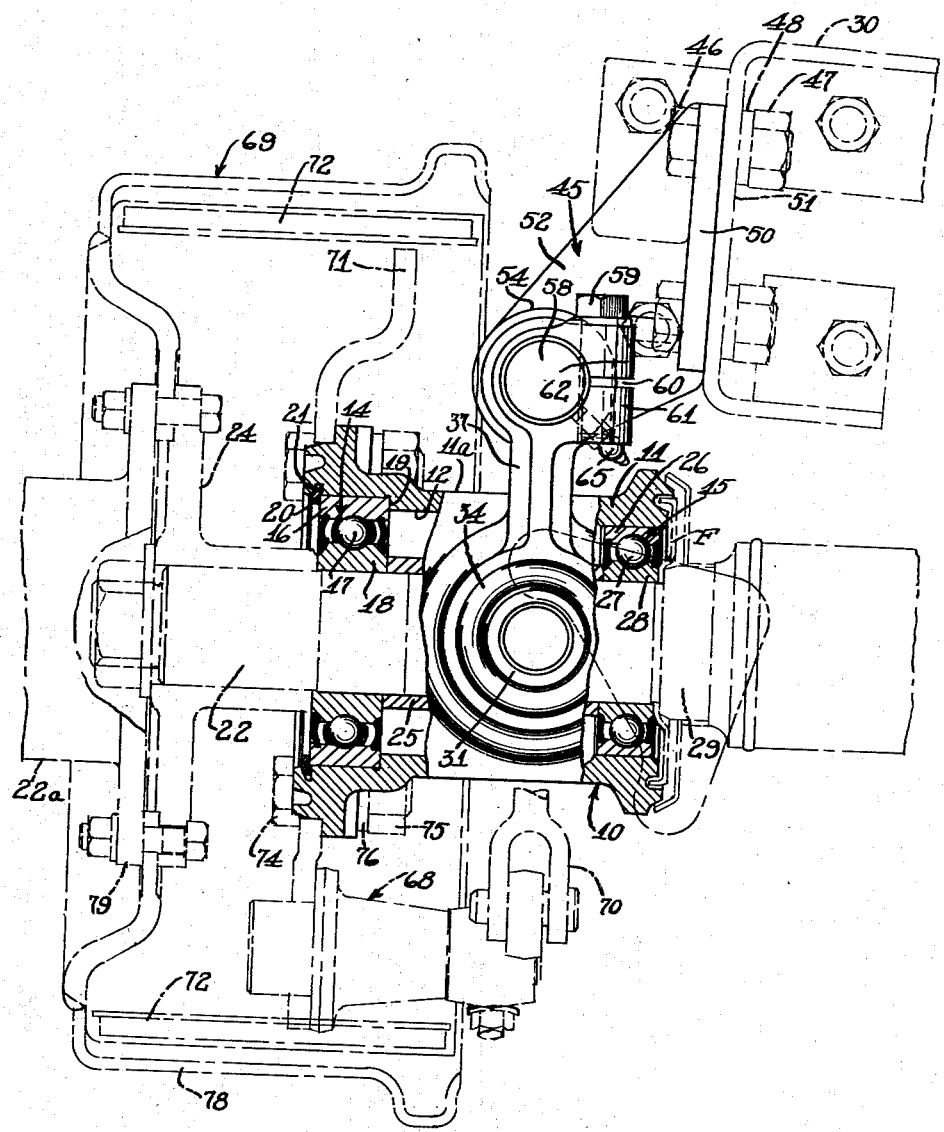

2,687,787

UNITED STATES PATENT OFFICE 2,687,787

RESILIENTLY MOUNTED SHAFT AND BRAKE HANGER

Albert W. Gair, Fraser, Mich., assignor to Thompson Products, Inc., Cleveland, Ohio, a corporation of Ohio Application June 19, 1951, Serial No. 232,415

8 Claims. (Cl. 188—205)

This invention relates to a brake torque absorbing shaft hanger. More specifically, the invention relates to a propeller shaft hanger which resiliently supports a vehicle propeller shaft assembly for free rotation, which accommodates axial shifting of the shaft assembly and which carries the stationary parts of an auxiliary vehicle brake to transmit the brake load direct to the vehicle frame.

Ordinarily, an auxiliary vehicle brake is mounted on the transmission so that brake loads are transmitted to the transmission housing. Additional shaft mounting means are then provided for the two or more sections of the vehicle's propeller shaft. The present invention provides a simple and efficient hanger for both the brake and shafts which accommodates shifting of the shafts and transmits brake torque to the vehicle frame. The hanger preferably has rubber bushings for cushioning the brake loads and for resiliently carrying the shaft bearings.

It is then an object of the present invention to provide a brake torque absorbing shaft hanger.

Another object of the invention is to provide a swingable hanger for resiliently supporting a rotatable propeller shaft and stationary brake parts.

A further object of the invention is to provide a compact dual purpose propeller shaft hanger and brake support having resilient bushings for cushioning the braking torque and for dampening out bearing noises and shaft vibrations.

A specific object of the present invention is to provide a rubber bushed shaft hanger and brake carrier which will accommodate axial movement of the shaft without affecting free shaft rotation or efficient brake action.

Other objects, features and advantages will be apparent from the following detailed description of one embodiment of the invention shown in the accompanying drawings.

On the drawings:

Figure 1 is an end elevational view, with parts in transverse section, of a shaft bearing hanger according to the present invention with the braking structure shown in phantom outline;

Figure 2 is a side elevational view, with parts in longitudinal section, of the hanger assembly shown in Figure 1 and further illustrating the relationship of the brake to the hanger.

As shown on the drawings:

In the drawings the shaft hanger 10 of this invention comprises a housing 11 having a central generally cylindrical body portion 11a with a cylindrical bore or opening 12 extending therethrough and with a pair of anti-friction bearings 14 and 15 secured in the opposite end portions thereof.

The bearing 14 has an outer race ring 16, a plurality of ball bearings 17 and an inner race ring 18, with the outer race ring retained between an annular shoulder 19 and a snap ring 20 disposed in an annular groove 21. The inner race ring 18 is disposed about a portion of a vehicle propeller shaft 22 with one side abutting the end of a flanged collar 24 and the other side abutting the end of a spacing sleeve 25. The anti-friction bearing 15 has an outer race ring 26 secured in one end portion of the opening 12 as by being press fitted therein, a plurality of ball bearings 27, and an inner race ring 28. The inner race ring 28 is disposed about another portion of the propeller shaft 22 and has one side against the opposite end of the spacing sleeve 25. The inner race ring 28 is retained against movement in the other direction by the ball bearings 27 and an enlargement 29 formed on the propeller shaft which clamps a bearing seal flange F against the inner race ring.

In order to resiliently and pivotally secure the housing 11 to a cross frame member 30 of a vehicle or the like, the cylindrical body 11a is provided with a pair of opposed lateral trunnions or gudgeons 31 with annular shoulders 32 formed at the junctures of the bosses with the central portion of the housing. A resiliently yieldable bushing 34, formed of rubber or the like, is disposed in conforming relation about each of the bosses 31. The bushings 34 have integral outturned annular flanges 35 abutting the shoulders 32 and are provided with axially inwardly tapered frusto-conical outer surfaces 36.

A pair of laterally aligned suspension pivot arms 37, 37 have end bosses 38 provided with frusto-conical transverse bores 39 disposed in conforming relation about the frusto-conical bushing surfaces 36. When assembled thus the bushings 34 are pre-loaded, so that pivoting of the housing will be accommodated by torsional stresses set up in the bushings. Annular grooves 40 are provided at the inner ends of the bores 39 and afford annular shoulders 41 which abut the bushing flanges 35 on the sides opposite the housing shoulders 32 to prevent metal to metal contact between the arms 37 and the housing. The opposite ends of the pivot arms 37 are provided with split attachment bosses 42 having cylindrical bores 44 therethrough with the axes of the bores 44 being parallel to those in the bores 39.

In order to pivotally attach the arms 37 to the frame member 30, a frame bracket 45 is fixedly secured to the frame member by means of bolts 46, nuts 47 and washers 48 with the bolts extending through a pad portion 50 which abuts a web 51 of the frame member. The bracket 45 has a pair of integral reinforcing flanges 52 extending away from the pad portion 50 and supporting at their outer ends an integral barrel portion 54. The barrel 54 is provided with a bore 55 having nested sleeves therein including an outer sleeve 56 and an inner sleeve 57 secured in conforming relation therein. A pivot pin 58 is journaled in the bore 55 in the inner surface of the inner sleeve 57. The opposite ends of the pin 58 extend out of the bore and are retained in the cylindrical apertures 44 formed through the pivot arm bosses 42 by means of bolts 59 extending across slots 60 which are defined between pairs of opposed clamp ears 61 and 62. A pair of thrust washers 64 are disposed between the opposing ends of the barrel 54 and the bosses 42.

In order to lubricate the journal portion of the pivot pin 58, a lubricant fitting 65 may be inserted through the wall of the barrel 54 to communicate with the surface of the pin.

For lubricating the anti-friction bearings 14 and 15, the gudgeons 31 may be formed with axial apertures 66 which communicate with the interior of the opening 12 and are normally closed by means of closure members 67.

From the structure described thus far, it will be seen that axial movement of the propeller shaft 22 is accommodated by pivoting of the housing 11 on the trunnion mounts 31 and by pivoting of the pivot arms 37 with the pivot pin 58 which is rotatable in the barrel 54 of the bracket 45. Vibration of the propeller shaft will be damped by means of the resilient bushings 34 so that vibration of the vehicle frame and the noise level will be substantially reduced. Also, the pivotal mounting of the housing will compensate for discrepancies in length and axial location of the shaft. Other tolerance discrepancies will be accommodated by the resilient bushings 34 so that the shaft will be substantially self-aligning and the various shaft mounting bearings will be protected against unusual and unnecessary loads.

According to the concepts of the present invention, auxiliary brake means are associated with the shaft bearing hanger and the adjacent portion of the shaft for selectively arresting rotation of the shaft and transferring the braking torque through the hanger assembly housing to the vehicle frame. Herein such means comprise non-rotatable brake mechanism 68 secured to the body 11 and rotatable braking structure 69 secured to the adjacent portion of the propeller shaft 22. The brake mechanism 68 may comprise an actuating linkage assembly 70, a brake backing plate 71 and brake shoes 72. The backing plate is fixedly secured to the body 11 by means of bolts 74, nuts 75 and washers 76 with the bolts extending through the backing plate and integral ears 77 formed on the body 11. The braking structure 69 may comprise a brake drum 78, which may be secured to the propeller shaft 22 through the flanged collar 24 and an opposing flange 79 formed at the end of a second propeller shaft section 22a. The brake drum 69 is mounted about the brake shoes 72 in the conventional manner so that when the auxiliary brake is actuated through the linkage 70, the brake shoes will be expanded outwardly to engage the inner surface of the brake drum to arrest rotary movement of the propeller shaft.

It will be seen that when the auxiliary brake is actuated, the braking torque will be transmitted to the hanger body 11 and from the body will be transmitted to the vehicle frame through the resilient bushings 34, the pivot arms 37, the pivot pin 58 and the attachment bracket 45. Referring to Figure 1, it will be seen that the frustoconical configuration of the bushing, which affords a greater thickness axially outwardly, will evenly and resiliently transfer the braking torque from the trunnion mounts 31 to the pivot arms. This will be readily understood since the greater thickness of the bushings is at the outward end portions of the mounts where the greatest amount of rotational movement will occur in response to the braking torque.

From the foregoing description, it will be understood that the present invention provides an improved and simplified shaft bearing hanger which will accommodate axial movement of the propeller shaft and will damp vibration of the shaft. An auxiliary braking mechanism is included in combination with the bearing hanger so that braking torque is efficiently transmitted from the braking mechanism through the hanger housing to the vehicle frame.

It will be understood that modifications and variations may be effected without departing from the scope of the novel concepts of the present invention.

I claim as my invention:

1. In a vehicle having a rotatable propeller shaft and a shaft brake, a shaft and brake hanger comprising a hollow housing with opposed lateral gudgeons, bearing supported in said housing for rotatably supporting the shaft means having lower end structure resiliently pivoted on said gudgeons and upper end structure pivoted on the vehicle to swingably mount the housing and to absorb vibration, brake mechanism non-rotatably secured to said housing, and rotatable brake structure secured to the shaft in position for braking engagement by said mechanism to retard rotation of the shaft whereby torsional braking torque applied to said housing from said shaft is resiliently transmitted through said housing and resilient pivots to the vehicle.

2. A shaft and brake hanger for a rotatable propeller shaft and an auxiliary brake of a vehicle, comprising a housing having a longitudinal central bore, bearing means in said bore for rotatably supporting the shaft, means extending transversely of said housing and said shaft and resiliently pivotally connecting said housing to the vehicle about an axis transverse to the shaft, a brake backing plate mounted on said housing, braking means secured to said backing plate, and a brake drum mounted on the shaft in position for braking engagement by said braking means to retard rotation of the shaft, whereby braking torque is transmitted from the braking means through said resilient means to the vehicle to thereby absorb torsional shocks and vibrations from said shaft and braking means.

3. In a vehicle having a rotatable propeller shaft, a supporting and braking assembly comprising a housing having a central opening for receiving the shaft freely therethrough and a pair of trunnions mounted thereon and extending transversely of the axis of the shaft, bearing means in said opening for rotatably supporting the shaft, resilient bushings enveloping said trunnions, a pair of pivot arms each having one end pivotally secured to the vehicle and the other end enveloping one of said bushings to accommodate axial movement of the shaft and to absorb vibrations, a brake backing plate mounted on said housing, braking means secured to said backing plate, and a brake drum mounted on the shaft in position for braking engagement by said braking means to retard rotation of the shaft, whereby torsional braking torque is resiliently transmitted from said plate and housing through said bushings to the vehicle.

4. A supporting and braking combination for a rotatable propeller shaft in a vehicle, comprising a housing having a pair of lateral trunnions thereon, bearing means secured to the housing for rotatably supporting the shaft, a resilient bushing secured about each of said trunnions, a pair of pivot arms each having an end portion engaged about one of said bushings, an attachment bracket affixed to the vehicle, means pivotally securing the other end portions of said arms to said bracket, whereby axial movement of the shaft is accommodated by pivoting of the housing and the arms and torsional shaft vibrations are absorbed by said bushings, brake means secured to said housing, and braking structure secured to the shaft in position for braking engagement by said brake means to retard rotation of the shaft, whereby braking torque is resiliently transmitted from said housing through said bushings to the vehicle.

5. A shaft and brake hanger comprising a generally cylindrical body with a longitudinal bore therethrough and laterally extending opposed gudgeons thereon, bearings in said bore for rotatably supporting a shaft, a resilient bushing disposed about each of said gudgeons, a pair of pivot arms having end portions engaged about said bushings, an attachment bracket, a pivot pin journalled in said bracket, said arms having their other ends secured to said pivot pin whereby axial movement of the shaft is accommodated by pivoting of the housing and the arms while shaft vibrations are absorbed by said bushings, means for mounting non-rotatable brake structure on the housing, and cooperating braking means on said shaft whereby braking torque is resiliently transmitted from said housing through said bushings to the vehicle.

6. A shaft and brake hanger comprising a housing having a longitudinal bore therethrough, bearing means in said bore for rotatably supporting a shaft, said housing having a pair of oppositely extending aligned gudgeons perpendicular to a shaft carried by said bearing means, annular shoulders at the inner ends of the gudgeons, brake mounting means in said housing, resiliently yieldable bushings disposed in conforming relation about said gudgeons and having annular flanges abutting said shoulders, a pair of pivot arms having end portions conformingly engaging said bushings with annular shoulders abutting said bushing flanges outwardly of said housing shoulders, an attachment bracket having a transverse bore, a bearing sleeve in said bore, a pivot pin journaled in said sleeve and having end portions extending out of said bore, and said pivot arms having end portions secured to the pivot pin end portions, whereby axial movement of the shaft is accommodated by pivoting of the housing and the arms and torsional and lateral shaft and brake vibrations are absorbed by said bushings.

7. A brake and shaft hanger comprising a generally cylindrical housing having a longitudinal bore therethrough, a pair of oppositely extending cylindrical trunnions in said housing perpendicular to the axis of the bore with annular shoulders formed at the junctures of the trunnions with the housing, said bore having bearings secured therein for rotatably supporting a shaft, attachment means on one end of the housing for rigidly mounting a brake plate substantially concentrically thereto, resiliently yieldable bushings disposed in conforming relation about said trunnions and having annular flanges abutting said shoulders, said bushings having inwardly tapered frusto-conical outer surfaces, a pair of pivot arms each having a frusto-conical bore in one end portion with an annular shoulder formed at the inner end of the bore, said frusto-conical bores enveloping said bushings and said pivot arm shoulders abutting said bushing flanges, an attachment bracket having a bore disposed transversely of the housing bore, and a pivot pin journaled in said bore of the bracket and having end portions extending beyond said bore, said pivot arms having bosses enveloping said end portions of the pivot pin, and means for clamping the bosses on said end portion whereby axial shifting of said shaft is accommodated by said pivot arms and pivots and torsional forces of said brake are resiliently transmitted to the pin through said bushings.

8. In a shaft and brake hanger for cooperation with a rotatable shaft, a hollow housing with opposed trunnions extending transversely of the axis of said shaft, a bearing supported in said housing for rotatably supporting the shaft, means resiliently pivoted on said trunnions, said means being pivoted in turn to a fixed support to swingably mount the housing for absorption of vibration and accommodation of axial movement of said shaft, non-rotatable brake mechanism secured to said housing, and rotatable brake structure secured to the shaft in position for braking engagement by said non-rotatable brake mechanism to retard rotation of the shaft whereby torsional braking torque is transmitted through said housing and resilient pivots to said fixed support and whereby said resilient pivots absorb torsional vibrations incident to braking action.

References Cited in the file of this patent

UNITED STATES PATENTS

| Number | Name | Date |
|---|---|---|
| 1,282,401 | Farmer | Oct. 22, 1918 |
| 1,400,340 | Alborn | Dec. 13, 1921 |
| 1,537,579 | Bower et al. | May 12, 1925 |
| 1,691,970 | Haggart, Jr. | Nov. 20, 1928 |
| 2,450,279 | Guy | Sept. 28, 1948 |
| 2,606,036 | Collender | Aug. 5, 1952 |